United States Patent [19]

Asano et al.

[11] Patent Number: 4,668,531

[45] Date of Patent: May 26, 1987

[54] METHOD FOR MANUFACTURE OF ELECTRODE

[75] Inventors: Hiroshi Asano, Kanagawa; Takayuki Shimamune, Tokyo; Yukiei Matsumoto, Kanagawa, all of Japan

[73] Assignee: Permelec Electrode Ltd., Kanagawa, Japan

[21] Appl. No.: 878,542

[22] Filed: Jun. 25, 1986

Related U.S. Application Data

[63] Continuation of Ser. No. 696,607, Jan. 30, 1985, abandoned.

[30] Foreign Application Priority Data

Jan. 31, 1984 [JP] Japan ................................. 59-14412

[51] Int. Cl.$^4$ ............................................. C25B 11/10
[52] U.S. Cl. ..................................... 427/58; 427/123; 427/125; 427/126.1; 427/126.3; 427/126.4; 427/126.5; 427/126.6; 427/226
[58] Field of Search ..................... 427/123, 125, 126.5, 427/226, 58, 126.1, 126.4, 126.3

[56] References Cited

U.S. PATENT DOCUMENTS

| | | | |
|---|---|---|---|
| 3,081,200 | 3/1963 | Tompkins | 427/129 |
| 3,663,414 | 5/1972 | Martinsons et al. | 427/226 |
| 3,672,990 | 6/1972 | Beck et al. | 427/226 |
| 3,850,665 | 11/1974 | Plumat et al. | 427/226 |
| 4,213,843 | 7/1980 | Sato et al. | 427/126.5 |
| 4,214,971 | 7/1980 | Heikel et al. | 427/126.5 |
| 4,431,686 | 2/1984 | Bewer | 427/126.5 |

*Primary Examiner*—Richard Bueker
*Attorney, Agent, or Firm*—Sughrue, Mion, Zinn, Macpeak, and Seas

[57] ABSTRACT

A method for the manufacture of an electrode by a thermal treatment of a liquid composition containing an electrode component metal, where the electrode is produced in a high yield and high ratio of retention of the component metal, in which a liquid composition containing an electrode component metal and an organic compound as a ligand capable of forming a complex with a metal ion of the electrode component metal is heat treated.

1 Claim, No Drawings

METHOD FOR MANUFACTURE OF ELECTRODE

This is a continuation of application Ser. No. 696,607, filed Jan. 30, 1985, now abandoned.

FIELD OF THE INVENTION

This invention relates to a method for the manufacture of an electrode for forming an electrode substance or an electrode coating by thermal treatment of a liquid composition containing an electrode component metal.

BACKGROUND OF THE INVENTION

Electrodes are used on a commercial scale in various electrochemical processes such as electrolyses, electrolytic treatments, and galvanic cells. Electrodes of various types and modes for various applications have been manufactured. These electrodes are preponderantly in the form of insoluble solids. Generally, metals or metal compounds such as oxides thereof which possess the activity and durability expected of any electrode are used either in the form of particles or deposited in the form of coatings on suitable substrates.

Insoluble electrodes formed by coating a substrate of metallic titanium with metal oxides including platinum group metal oxides, for example, are widely used on a commercial scale for electrolysis of aqueous solutions such as of sodium chloride. Electrodes formed of particles of metals or metal oxides and electrodes formed by sintering such particles or molding such particles with suitable binders have been used in electrolyses, electrolytic treatments, and galvanic cells.

Electrodes of the types described above can be prepared by various methods. Among these methods, the so-called thermal decomposition method which comprises the steps of preparing a liquid composition containing an electrode component metal and subjecting this liquid composition directly, or applied on a substrate, to a thermal treatment thereby converting the component metal into an electrode substance in the form of a metal or a metal oxide finds general acceptance as highly effective means.

Generally in this particular method, a composition containing a salt of a thermally decomposable electrode component metal and a solvent is subjected to a thermal treatment at an elevated temperature of about 250° to 800° C. Thermally decomposable salts which can be used include chlorides, oxychlorides, alkoxy halides, resinates, amines, etc. of various electrode component metals. As solvents therefor, water, hydrochloric acid, various alcohols, toluene, and benzene have been suitably adopted (as disclosed in Japanese Patent Publication No. SHO-48(1973)-3954 corresponding to U.S. Pat. No. 3,711,385 and Japanese Patent Application Laid-Open No. SHO 51(1976)-131475, for example).

When the conventional composition for electrode production is subjected to a thermal treatment aimed at removing the solvent through volatilization and thermally decomposing the salt of an electrode component metal into a corresponding metal, or further converting the metal into a corresponding metal oxide, however, the electrode component metal is often diffused in a large volume as volatilized in the form of a chloride in conjunction with the solvent results in serious problems including lowered product yield, impaired product quality stability, and inevitable environmental pollution.

As a measure, it has been proposed, where Sn is used as an electrode-coating component, for example, to use a sulfate of Sn instead of a chloride of Sn (as disclosed in Japanese Patent Application Laid-Open No. SHO 52(1977)-141489, for example). This method is effective in lowering the loss of the Sn component by volatilization to a fair extent but it is not sufficient at the present. Further, the danger due to use of sulfuric acid, a strong acid, is involved. With respect to the electrode components other than Sn, the aforementioned problems remain yet to be solved. Thus, it has been difficult to produce electrodes of various electrode components in a stable manner and in high yields by the thermal decomposition method.

SUMMARY OF THE INVENTION

An object of this invention is to provide an easy method for the manufacture of an electrode of stable quality in high yields.

This invention provides a method for the manufacture of an electrode for forming an electrode substance or an electrode coating by thermal treatment of a liquid composition containing an electrode component substance. This method comprises stabilizing the electrode component metal by adding to the composition an organic compound possessing a ligand capable of forming a complex with a metal ion of the electrode component metal.

This invention thoroughly fulfills the aforementioned object by providing the method just described and brings about an outstanding economic effect as described in detail below.

DETAILED DESCRIPTION OF THE INVENTION

This invention is applicable equally effectively to the manufacture of an electrode which does not involve use of a substrate and to the manufacture of an electrode deposited in the form of a coating on a substrate. Where the electrode involves a substrate, any of the electroconductive and durable substrates of varying substances and shapes heretofore used in anodes and cathodes are used. For example, valve metals such as Ti, Ta, Nb, and Zr are typical substrates for anodes and Fe, Ni, etc. are typical substrates for cathodes.

Various electrode substances formed by thermal treatment can be produced to suit various applications. They possess electrochemical catalytic property and durability and they are, generally, metals, metal oxides, or mixtures thereof in form. To form such an electrode substance in a free state or deposited on a substrate, a liquid composition containing a corresponding electrode component metal is prepared and subjected to thermal treatment held in a vessel or deposited on a suitable substrate. As already described, when the composition of the conventional approach is used and subjected to the thermal treatment at elevated temperatures of about 250° to 800° C., the electrode component is not retained in the form of metal or metal oxide or deposited fast on the substrate but is readily volatilized into a chloride, for example, and diffused in a large amount into the ambient air possibly to entail difficulties such as lowered yield of product and impaired stability of product quality. Among various electrode components, Al, Sn, Sb, Ge, Bi, Ga, In, Ti, Zr, Ta, Hf, V, Mo, Ru, Pd, Ir, etc. exhibit the aforementioned inclination conspicuously because the temperatures at which they are converted into their oxides are higher than the temperatures at which their chlorides are volatilized.

It has now been found that when the above-described composition for the manufacture of an electrode incorporates therein an organic compound as a ligand capable of forming a complex with a metal ion, the difficulties described above are eliminated because the amount of the above-described readily volatilized electrode component which is volatilized and diffused during the thermal treatment is decreased to a notable extent. This knowledge has led to an achievement of the present invention.

The reason for this effect is not completely clear at present. While not desiring to be bound, it is postulated that the ion of the electrode component metal in the liquid composition combines with the ligand through formation of a complex and stability is achieved. During the course of the thermal treatment, volatilization and diffusion are prevented and, instead, the electrode substance such as a metal or a metal oxide is converted in a high yield.

The organic compound, for use in this invention, must act as a ligand capable of forming a complex with a metal ion. Various organic compounds meet this requirement. They are acceptable for this invention as long as they are capable of forming a complex with the electrode component metal in ordinary liquid compositions such as those of aqueous solutions or aqueous alcohol solutions. This invention is not limited to any type of organic compound. Generally, an organic compound which volatilizes or decomposes at a temperature below about 300° C. and a metal or metal oxide is produced from the metal ion combined therein is suitable. From this point of view, the organic compound generally preferably has a small number (up to 12, for example) of carbon atoms because volatilization, decomposition, and oxidation proceed quickly when the number of carbon atoms is small. An organic compound of a large number of carbon atoms, however, can be rendered effectively used by supplying an ample amount of oxygen to the reaction system sufficient to ensure a thorough combustion of the organic compound.

Particularly desirable examples of organic compounds acting as a ligand capable of forming a complex with a metal ion as described above are set forth below. It should be noted, however, that this invention is not limited to these organic compounds.

Suitable examples of organic compounds include organic acids possessing a carboxyl group, such as formic acid, hydroxycarboxylic acid, malonic acid, tartaric acid, lactic acid, succinic acid, ascorbic acid, citric acid, salicylic acid, dihydroxybenzoic acid, phthalic acid, aluminon, saccharic acid, and hydroxynaphthalene-carboxylic acid and derivatives thereof; carbonyl compounds such as acetylacetone and arabinose; and compounds possessing a phenolic hydroxyl group such as catechol, pyrogallol, hydroxybenzaldehyde, nitrophenol, and nitrosonaphthol.

Suitable organic compounds also include compounds possessing a thiol group, a xanthate group, a thioamido group, a thioketone group, and a sulfonyl group, such as thioglycolic acid, thiomaleic acid, dithioacetic acid, dihydroxybenzene sulfonic acid, mercaptosuccinic acid, nitrosodihydroxybenzene sulfonic acid, sulfosalicylic acid, dihydroxynaphthalene sulfonic acid, dihydroxyanthraquinone sulfonic acid, maleonitrile dithiolic acid, aminothiophenol, dithiosalicylic acid, dithizone, and diethyldithiocarbamic acid.

Suitable organic compounds further include compounds possessing an amino acid group, an amido group, an amino group, an imido group, a pyridyl group, an imidazolyl group, a thiazolyl group, and a nitroso group such as ethylamine, ethylenediamine, ethanolamine, glycine, alanine, succinimide, glutamic acid, hydroxyglutamic acid, glycylalanine, salicylaldoxime, ethylenediaminetetraacetic acid, pyridine, aminopyridine, pyridinecarboxylic acid, picolinic acid, imidazole, thiazole, and cupferron and thiocyanic acid compounds.

This invention is further illustrated by reference to the following non-limiting examples. Unless otherwise indicated herein, all parts, percents, ratios and the like are by weight.

EXAMPLE 1

A liquid composition was prepared by thoroughly mixing 10 ml of an aqueous solution of 0.5 g of chloroplatinic acid as Pt, 1.1 g of iridium chloride as Ir, and 0.5 g of titanium trichloride as Ti with 40 ml of an aqueous solution containing 1.7 g of stannous chloride as Sn, and 10 g of ascorbic acid.

In a crucible, the liquid composition was calcined at 550° C. to obtain a residue preponderantly in the metal oxide form. This residue was analyzed by a fluorescent X-ray method to determine the yields of component metals of the produced substance relative to the starting materials. The results obtained are shown in Table 1 below.

In a comparative example, a composition obtained by mixing 10 ml of an aqueous solution of 0.5 g of chloroplatinic acid as Pt, 1.1 g of iridium chloride as Ir, and 0.5 g of titanium trichloride as Ti with 30 ml of a 20% hydrochloric acid solution containing 1.7 g of stannous chloride as Sn and 10 ml of isopropyl alcohol was similarly calcined.

TABLE 1

|  | Yield of Component Metal (%) | | | |
| --- | --- | --- | --- | --- |
|  | Pt | Ir | Ti | Sn |
| Example 1 | 99 | 98 | 96 | 98 |
| Comparative Example 1 | 98 | 74 | 71 | 59 |

EXAMPLE 2

As a substrate, a commercially available pure titanium plate, 50 mm×50 mm×3 mm (thickness), was degreased with acetone and pickled with oxalic acid. The same liquid composition as described in Example 1 was coated on the substrate with a brush, dried at room temperature (about 20°–30° C.), and heated at 550° C. for 10 minutes in an electric oven with forced circulation of air therethrough. By performing the steps of application and calcining of the liquid composition for a total of 20 cycles, an electrode having a coating 3µ in thickness was produced. In a comparative example, the same liquid composition as described in Comparative Example 1 was used similarly to produce an electrode.

The electrodes were analyzed by a fluorescent X-ray method to determine the ratio of electrode coating component metal retained on the substrate. The results obtained are shown in Table 2 below.

TABLE 2

|  | Ratio of Component Metal Retained (%) | | |
| --- | --- | --- | --- |
|  | Pt | Ir | Sn |
| Example 2 | 99 | 99 | 98 |

TABLE 2-continued

| | Ratio of Component Metal Retained (%) | | |
|---|---|---|---|
| | Pt | Ir | Sn |
| Comparative Example 2 | 99 | 71 | 45 |

(Note)
The data on the Ti component are omitted because the determination of this component was difficult due to the influence of the Ti component in the substrate upon which the coating was placed.

It can be seen from the results of Example 1 and Example 2 that when ascorbic acid as a ligand capable of forming a complex with a metal ion was added in accordance with the method of this invention to the liquid composition, the electrodes were obtained in high yields and high retention ratios because virtually no loss occurred in any of the electrode component metals as compared with the electrodes of Comparative Examples 1 and 2.

EXAMPLE 3

A liquid composition was prepared by mixing 0.5 g of chloroplatinic acid as Pt, 0.55 g of iridium chloride as Ir, 1.5 g of aqueous tantalum pentachloride solution as Ta, 0.2 g of cobalt chloride as Co, and 0.55 g of stannic chloride as Sn with 20 ml of 20% hydrochloric acid, 10 ml of butanol, and 5 g of pyrogallol.

In a comparative example, a similar liquid composition was prepared using the procedure just described, except that the addition of pyrogallol was omitted.

These liquid compositions were calcined in a crucible as in Example 1. The results obtained are shown in Table 3-1 below. They were also applied on a Ti substrate as in Example 2. The results obtained are shown in Table 3-2 below.

TABLE 3-1

| | Yield of Component Metal (%) | | | | |
|---|---|---|---|---|---|
| | Pt | Ir | Ta | Co | Sn |
| Example 3-1 | 99 | 99 | 97 | 99 | 98 |
| Comparative Example 3-1 | 99 | 73 | 36 | 98 | 31 |

TABLE 3-2

| | Ratio of Component Metal Retained (%) | | | | |
|---|---|---|---|---|---|
| | Pt | Ir | Ta | Co | Sn |
| Example 3-2 | 98 | 99 | 99 | 98 | 99 |
| Comparative Example 3-2 | 98 | 62 | 23 | 98 | 25 |

EXAMPLE 4

Three coating solutions were prepared by mixing 15 g of ruthenium chloride as Ru, 3 g of palladium chloride as Pd, 12 g of stannic chloride as Sn, and 2.5 g of antimony chloride severally with (1) 200 ml of isopropyl alcohol, 220 ml of pure water, and 90 g of pyridine pentacarboxylic acid (Example 4), (2) 400 ml of isopropyl alcohol and 20 ml of concentrated hydrochloric acid (36%) (Comparative Example 4-1), and (3) 400 ml of isopropyl alcohol and 20 ml of concentrated sulfuric acid (98%) (Comparative Example 4-2).

The liquid compositions described above were applied to substrates of Ti by following the procedure of Example 2, except that the calcining temperature was changed to 570° C. to obtain electrodes. These electrodes were tested for retention ratios of component metals. The results obtained are shown in Table 4 below.

TABLE 4

| | Ratio of Component Metal Retained (%) | | | |
|---|---|---|---|---|
| | Ru | Pd | Sn | Sb |
| Example 4 | 97 | 99 | 99 | 98 |
| Comparative Example 4-1 | 92 | 40 | 12 | 23 |
| Comparative Example 4-2 | 90 | 82 | 81 | 43 |

EXAMPLE 5

A liquid coating composition was prepared by adding 40 g of 8-hydroxyquinone-5-sulfonic acid to an aqueous hydrochloric acid solution (5%) containing 1.40 g of chloroplatinic acid as Pt, 0.45 g of palladium chloride as Pd, 9.5 g of stannic chloride as Sn, and 0.85 g of bismuth chloride as Bi and diluting the resultant solution with pure water to about 100 ml.

The coating composition so obtained was applied on the same type of titanium plate as in Example 2 with a brush, dried at 120° C. for 5 minutes, and calcined at 500° C. for 20 minutes. This procedure was performed for a total of 20 cycles to produce an electrode.

The coating composition and the electrode obtained by applying this composition on the Ti substrate was analyzed to determine the percentage composition of electrode component metals. The results obtained are shown in Table 5 below.

TABLE 5

| | Composition of Component Metals (mol %) | | | |
|---|---|---|---|---|
| | Pt | Pd | Sn | Bi |
| Liquid Composition | 7.53 | 4.46 | 83.7 | 4.27 |
| Electrode Deposited | 7.74 | 4.37 | 80.4 | 4.36 |

It can be seen from the results in Table 5 that, if produced by the method of this invention, the electrode deposited on the substrate had substantially the same composition of component metal as the coating composition, indicating that the electrode deposited on the substrate retained the component metals at high retention ratios because virtually no volatilization occurred during the course of heating and calcining.

EXAMPLE 6

A liquid coating composition was prepared by adding 50 g of aluminon to 5.15 g of rhodium chloride as Rh, 2.53 g of ruthenium chloride as Ru, 2.5 g of antimony chloride as Sb, 1.5 g of aqueous hydrochloric acid solution (20%) of tantalum pentachloride as Ta, and 3.5 g of aqueous hydrochloric acid solution (20%) of zirconium chloride as Zr and diluting the resultant solution with pure water to about 100 ml. From this coating composition, an electrode was produced by following the procedure of Example 5.

The coating composition and the electrode deposited on the substrate were analyzed to determine the percentage composition of component metals. The results obtained are shown in Table 6 below.

TABLE 6

| | Composition of Component Metals (mol %) | | | | |
|---|---|---|---|---|---|
| | Rh | Ru | Sb | Ta | Zr |
| Liquid Composition | 27.2 | 13.6 | 11.1 | 27.2 | 20.9 |
| Electrode Deposited | 27.4 | 14.2 | 10.7 | 26.9 | 20.8 |

As described above, the method of this invention enables an electrode to be manufactured in a high yield and high retention ratios of the component metals by preventing the possible loss of the component metals by vaporization during the course of heat treatment. It also permits an electrode of the required composition to be manufactured in a stable manner and with high repeatability. Thus, an electrode of high quality can be manufactured with ease by the present invention.

While the invention has been described in detail and with reference to specific embodiments thereof, it will be apparent to one skilled in the art that various changes and modifications can be made therein without departing from the spirit and scope thereof.

We claim:

1. A method for manufacturing an electrolytic electrode comprising the steps of:
    (a) forming a solution containing an electrode component metal selected from the group consisting of Al, Sn, Sb, Ge, Bi, Ga, In, Ti, Zr, Ta, Hf, V, Mo, W, Ru, Pd and Ir, and at least one organic compound selected from the group consisting of ascorbic acid, pyrogallol, pyridinepentacarboxylic acid, 8-hydroxyquinone-5-sulfonic acid and aluminon as a ligand capable of forming a complex with metal ions of said electrode component metal;
    (b) coating the solution formed in (a) onto an electrode substrate; and
    (c) subjecting said coated substrate to thermal treatment at an elevated temperature of from about 250° to about 800° C. in an oxidative atmosphere, wherein the volatilization and diffusion of said electrode component metal combined with said organic compound is prevented during the thermal treatment.

* * * * *